United States Patent [19] [11] 3,868,384
Szinai et al. [45] Feb. 25, 1975

[54] PERFLUOROALKYL DERIVATIVES
[75] Inventors: Stephen S. Szinai, Workingham, Berkshire, England; George Crank, Kensington, New South Wales, Australia; David R. K. Harding, London, Ontario, Canada
[73] Assignee: Lilly Industries, Ltd., London, England
[22] Filed: Dec. 19, 1972
[21] Appl. No.: 316,616

Related U.S. Application Data
[62] Division of Ser. No. 84,462, Oct. 27, 1970, abandoned.

[30] Foreign Application Priority Data
Oct. 28, 1969 Great Britain .................... 52837/69

[52] U.S. Cl.... 260/307 F, 260/239 BC, 260/243 R, 260/244 R, 260/251 R, 260/268 R, 260/268 C, 260/293.9, 260/306.7, 260/309.7, 260/333, 260/327 R, 260/456 A, 260/563 P, 260/584 R, 260/584 C, 424/272
[51] Int. Cl............................................. C07d 85/36
[58] Field of Search.................... 260/244, 307, 333

[56] References Cited
UNITED STATES PATENTS
3,385,828   5/1968   Kocher et al. ...................... 260/244

OTHER PUBLICATIONS
Crank et al., J. Med. Chem., Vol. 13, pp. 1212–1216 (11/1970).

Primary Examiner—Harry I. Moatz
Attorney, Agent, or Firm—James L. Rowe; Everet F. Smith

[57] ABSTRACT
Open chain and cyclic perfluoroalkyl derivatives such as 2,2,2-trifluoroethylidene cyclohexylamine and 2-trifluoromethyloxazolidine, useful as anti-inflammatory agents.

1 Claim, No Drawings

PERFLUOROALKYL DERIVATIVES

This is a division of application Ser. No. 84,462, filed Oct. 27, 1970, now abandoned.

SUMMARY

This invention relates to biologically active chemical compounds and in particular to a novel class of chemical compounds which show anti-inflammatory, anti-parasitic and/or herbicidal activity.

This invention provides chemical compounds and their biologically useful salts, said compounds being represented by the formula:

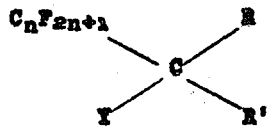

wherein
X represents a hydrogen atom or the group $C_mF_{2m+1}$;
m and n individually and separately represent integers of from 1 to 3;
R is hydroxyl, methoxyl, or ethoxyl;
R' is —NH—1-adamantyl, piperidino,

wherein
R" is $C_1$–$C_3$ alkyl or lower acyl; —NH—CH$_2$—CH$_2$—R''',
wherein
R''' is hydroxyl, amino, $C_1$–$C_3$ alkylamino, or di($C_1$–$C_3$ alkyl)-amino; and

wherein R'''' is $C_1$–$C_3$ alkyl or $C_5$–$C_6$ cycloalkyl; and
R and R', when taken together with the carbon atom to which they are attached, form a heterocyclic ring of the formula:

wherein each X is individually hydrogen, $C_1$–$C_6$ alkyl, or phenyl, p is a number from 0 to 2, Y is hydrogen, $C_1$–$C_6$ alkyl, or COOX, and Z is O, S, or NH;
Or form an amino compound of the formula:

wherein R''''' is $C_1$–$C_6$ alkyl, $C_3$–$C_8$ cycloalkyl, or 1-adamantyl.

Also included within the scope of this invention are acid-addition salts with pharmaceutically acceptable acids of the compounds represented by the above formula. Among the pharmaceutically acceptable acids which form acid-addition salts with the bases of this invention are included inorganic acids such as sulfuric, phosphoric, phosphorous, nitric, nitrous, hydrochloric, hydrobromic, hydriodic, pyrophosphoric, and the like acids, as well as organic acids such as succinic, maleic, acetic, butyric, tartaric, hemimellitic, benzoic, naphthoic, phthalic, toluenesulfonic, and the like acids.

In compounds of the above described general formula in which R and R' taken together with the carbon atoms to which they are attached represent

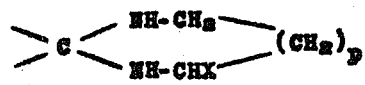

it should be noted that, particularly, in the case where p is O and X represents hydrogen, although the compounds in question have been described by the structural formula given above the compounds exist in fact in the form of an equilibrium mixture, the hydrated molecules of this structure being in equilibrium with molecules in which R and R' taken together with the carbon atom to which they are attached represent the structure

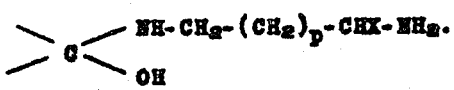

It is to be understood therefore that whenever this type of equilibrium exists the scope of the invention extends to the molecules of both structures and also to the equilibrium mixture of the two types of molecule.

In the above formulas the term $C_1$–$C_3$ alkyl includes methyl, ethyl, propyl, or isopropyl; the term lower acyl includes acetyl and propionyl; the term $C_1$–$C_6$ alkyl includes the radicals given above for $C_1$–$C_3$ alkyl plus such radicals as isobutyl, t-butyl, n-butyl, sec-butyl, and the various primary, secondary, and tertiary pentyl and hexyl radicals whose structures are well known to those skilled in the art; the term $C_5$–$C_6$ cycloalkyl includes cyclopentyl and cyclohexyl; and the term $C_3$–$C_8$ cycloalkyl includes both the above cycloalkanes plus cyclopropyl, cyclobutyl, 1-adamantyl, 2,2,2-bicyclooctyl, cycloheptyl, cyclooctyl and the like. Preferred groups include t-butyl, cyclohexyl and 1-adamantyl.

Notwithstanding the above definitions it will be understood that the invention provides in one of its broadest aspects a class of pharmaceutically useful compounds having as a common feature the structure

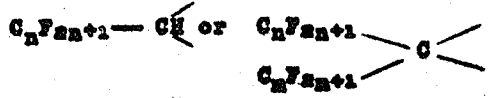

where the symbols n and m are as defined above.

Compounds of the above described class have shown positive results in tests for anti-inflammatory activity. When used as anti-inflammatory agents the compounds can be administered by the oral, intraperitoneal, intravenous, or subcutaneous routes. For oral administration, the compounds are formulated in telescoping gelatin capsules with or without excipients such as starch or talc, or as a tablet after admixing with customary tablet-making ingredients such as micro-crystalline cellulose, starch, talc, lactose and the like as well as binders or lubricants such as ethyl cellulose and stearic acid or its salts. For intraperitoneal or subcutaneous administration, the compound is ground with Emulphor (a polyoxyethylated fatty acid which is water miscible and nontoxic when diluted 1:10 with either sterile water or sterile physiological saline solution). The Emulphor suspension is administered as such or can be diluted with water. For intravenous administration, the Emulphor suspension is diluted 1:10 with physiological saline.

The following preparations will serve to illustrate the novel pharmaceutical corporation in unit dosage form for oral administration useful in the anti-inflammatory process of this invention.

PREPARATION I 6.55 g. of 2,2,2-trifluoroethylidene cyclohexylamino was mixed thoroughly with 2.29 g. of starch. The empty telescoping gelatin capsules were filled with 0.27 g. each of the above mixture.

PREPARATION II 5g. of 2-trifluoromethyl oxazolidine were dissolved in 250 ml. of ethylenedichloride. The resulting solution was slurried with 2.5 g. of starch and the solvent removed by evaporation. Empty telescoping gelatin capsules were filled with 0.30 g. each of the above mixture.

PREPARATION III

Telescoping gelatin capsules were each filled with the following mixture: 1.7 g. 2-heptafluoropropyl imidazoline, thoroughly milled; 166 mg. lactose; 166 mg. starch; and, 8 mg. polyoxyethylene sorbitan monooleate.

The compounds can be administered to mammals at the rate of from 50 to 150 mg/kg of mammalian body weight per day.

Following is a description by way of example of the preparation of specific compounds falling within the scope of this invention.

EXAMPLE 1

2,2,2-Trifluoroethylidene cyclohexylamine

Trifluoroacetaldehyde monohydrate (5.8 g. — 0.05 moles) and cyclohexylamine (5.5 g. — 0.055 moles) were heated together in toluene (50 ml.). Water (1.8 g. — 0.1 mole) was evolved in 1½ hr. Excess toluene was removed by cautious evaporation and the residual oil (5.5 g.) was distilled. The product was 5.0 g. (56%) of a clear oil, B.P. 144°–146°C/760mm.

EXAMPLE 2

2,2,3,3,3-Pentafluoropropylidene cyclohexylamine

Pentafluoropropionaldehyde monohydrate (8.4 g. — 0.05 moles) and cyclohexylamine (5.5 g. — 0.055 moles) in benzene (100 ml.) were refluxed together for 2 hrs. Water (1.8 ml. — 0.1 mole) was collected in a Dean and Stark trap in this time. Evaporation of benzene left an oil, which was distilled. The product was 8.4 g. of a clear oil, B. P. 142°–148° C. Redistillation gave a product 5.4 g. (49%), B.P. 148°–150° C.

EXAMPLE 3

2,2,3,3,3-Pentafluoropropylidene tertiarybutylamine

Pentafluoropropionaldehyde monohydrate (8.4 g. — 0.05 moles) and t-butylamine (4.0 g. — 0.055 moles) were heated together in an oil bath at 110° C. for 2 hrs. The mixture was distilled, and the distillate was passed through a short alumina column, eluting with ether. Removal of the ether by evaporation left an oil which was distilled to yield 5.7 g. of an oil, B.P. 89°–90° C. Redistillation yielded 3.4 g. (32%) of a product, B.P. 90°–91° C.

EXAMPLE 4

2,2,2-Trifluoroethylidene-1-adamantylamine

1-Aminoadamantane (4.0 g. — 0.0265 moles) and trifluoroacetaldehyde monohydrate (3.1 g. — 0.0265 moles) in benzene (100 ml.) were refluxed for 2 hours. Water (0.9 ml. — 0.05 moles) was collected in a Dean and Stark trap. Evaporation of benzene left a crystalline solid. The solid was dissolved in light petrol and passed through a short alumina column. Evaporation of the eluted solution left 3.0 g. of a white crystalline solid. The product was sublimed to give 2.06 g. (34%) of a white crystalline solid, m.p. 49°–50° C. Analysis calculated for $C_{12}H_{16}F_3N$: C, 62.3; H, 6.9; F, 24.6; N, 6.1%. Found: C, 62.2; H, 7.1; F, 24.7; N, 5.9%.

EXAMPLE 5

2,2,3,3,3-Pentafluoropropylidene-1-adamantylamine

1-Aminoadamantane (5.5 g. — 0.0365 moles) and pentafluoropropionaldehyde monohydrate (6.1 g. — 0.0365 moles) in benzene (100 ml.) were refluxed together for 2 hours. Water (1.3 ml. — 0.7 moles) was collected in a Dean and Stark trap. Solvent was removed by evaporation in vacuo, and the residual oil was purified by passage through a short neutral alumina column. The eluted solution was concentrated and the product was distilled to give 8.5 g. (82%) of a colorless oil, B.P. 111°C/18mm.

EXAMPLE 6

2,2,3,3,3-Pentafluoro-1-ethoxy-1-tosyloxypropane

Pentafluoropropionaldehyde hemiacetal (3.9 g. — 0.02 moles) was dissolved in dioxane (20 ml.). P-toluenesulphonyl chloride (4.0 g. — 0.022 moles) was dissolved in another portion of dioxane (20 ml.) together with triethylamine (2.2 g. — 0.022 moles). The two solutions were mixed and left at 20° C. for 18 hours. Triethylamine hydrochloride was removed by filtration and the filtrate concentrated to give an oil which was distilled to yield 2.0 g. (29%) of an oil, B.P. 104°–106°C/2mm. Analysis: Calculated for $C_{12}H_{12}F_5SO_4$: C, 41.4; H, 3.7; F, 27.3%. Found: C, 41.4; H, 3.8; F, 27.1%.

EXAMPLE 7

2-Trifluoromethylimidazolidine hemihydrate

Ethylene diamine (6.0 g. — 0.1 mole) and trifluoroacetaldehyde hydrate (12 g. — 0.104 moles) were refluxed in benzene (100 ml.) for 1 hour. A Dean & Stark trap was then connected and boiling was continued for 20 hours. Water (2.5 ml.) collected during this time. Excess solvent was removed by evaporation and the oily residue in $CHCl_3$ was chromatographed on neutral alumina. Concentration of the eluted solution gave a crystalline solid [11.8 g. (79%)] m.p. ≈75° C. The product was recrystallized from chloroform/ether. Yield 8.2 g. m.p. 72°–75° C. Analysis: calculated for $C_4H_7F_3N_2$ ½ $H_2O$: C, 32.3; H, 5.4; N, 18.9; F, 38.2%. Found: C, 32.5; H, 5.7; N, 19.3; F, 37.2%.

EXAMPLE 8

2-Pentafluoroethylimidazolidine

Ethylenediamine (1.2 g. — 0.02 moles) and pentafluoropropionaldehyde hemiethyl acetal (3.9 g. — 0.02 moles) were heated together in an oil bath at 100° C. for 3 hours. Cooling of the reaction mixture gave a solid, which was sublimed under a low vacuum. The yield of the product was 2.85 g. (76%) m.p. 85° C. (in a sealed tube). Analysis: Calculated for $C_5H_7F_5N_2$: C, 31.6; H, 3.7; F, 50.2; N, 14.7%. Found: C, 31.6; H, 3.7; F, 49.8; N, 14.8%.

EXAMPLE 9

2-Heptafluoropropyl-imidazolidine

Ethylene diamine (1.2 g. — 0.02 moles) and heptafluorobutraldehyde hydrate (4.32 g. — 0.02 moles) in benzene (50 ml.) were refluxed for 1½ hours. A Dean and Stark trap was then connected and the reaction was continued for a further 3 hours. Removal of the solvent by evaporation left a solid, which was sublimed under low vacuum to yield 2.97 g. (62%) of a white crystalline substance. Analysis: calculated for $C_6H_7F_7N_2$: C, 30.0; H, 2.9; F, 55.4; N, 11.7%. Found: C, 29.9; H, 3.0; F, 55.3; N, 11.7%.

EXAMPLE 10

2-Trifluoromethyl-oxazolidine

Trifluoroacetaldehyde hydrate (13.0 g. — 0.11 moles) was slowly dripped onto a mixture of $P_2O_5$ (10 g.) and concentrated sulphuric acid (100 ml.). The mixture was stirred at 80° C. The evolved gases were passed through a solution of ethanolamine (6.1 g. — 0.1 mole) in dry tetrahydrofuran (75 ml.) at 0° C. The tetrahydrofuran was removed by evaporation under reduced pressure. The residue was distilled and the fraction with B.P. 138°–140° C. was collected. The yield was 6.95 g. (49%) of a colorless mobile liquid. Analysis: Calculated for $C_4H_8F_3NO$: C, 34.1; H, 4.3; F, 40.4; N, 9.9%. Found: C, 34.1; H, 4.4; F, 40.4; N, 10.1%.

EXAMPLE 11

2-Trifluoromethyl-4-ethyloxazolidine

Trifluoroacetaldehyde hydrate (13 g. — 0.11 moles) and 2-amino-1-butanol (8.9 g. — 0.1 mole) in benzene (100 ml.) were heated under reflux for one-half hour. A Dean and Stark trap was then connected and the reaction was allowed to proceed until no more water collected in the trap. Water (3.5 g. — 0.2 moles) collected in 24 hours. Benzene was removed by evaporation under reduced pressure and the residue in $CHCl_3$ was purified by passage through a short neutral alumina column. The eluted solution was concentrated to give an oil which was distilled to yield a product [10.65 g. (63%)] as a colorless liquid, B.P. 148°–153° C. Analysis: Calculated for $C_6H_{10}F_3NO$: C, 42.6; H, 6.0; F, 33.7; N, 8.3%. Found: C, 42.4; H, 6.3; F, 33.9; N, 8.2%.

EXAMPLE 12

2-Trifluoromethyl-5-methyloxazolidine

Trifluoroacetaldehyde hydrate (13 g. — 0.11 moles) and 1-amino-2-hydroxypropane (7.5 g. — 0.1 mole) in benzene (100 ml.) refluxed for one-half hour. A Dean and Stark trap was then connected and the reaction was continued until no more water came over (3.6 g. — 0.2 moles, collected in 24 hours). After removal of the solvent the residue was distilled and the fraction boiling between 130°–168° C. was collected (10.8 g.). Redistillation gave the product (8.0 g. — 52%) as a clear liquid, B.P. 132°–136° C. Analysis: calculated for $C_5H_8F_3NO$: C, 38.7; H, 5.2; N, 9.0%. Found: C, 39.2; H, 5.7; N, 9.5%.

EXAMPLE 13

2-Trifluoromethyl-4,4-dimethyl-oxazolidine

Trifluoroacetaldehyde hydrate (13 g. — 0.11 moles) and 2-amino-2-methyl-1-propanol (8.9 g. — 0.1 mole) were refluxed for one-half hour in benzene (100 ml.). The reaction was continued with a Dean and Stark trap until no more water collected (3.6 g. — 0.2 moles water came off in 24 hours). The reaction mixture was passed through alumina, concentrated and distilled. The portion boiling between 133°–153° C. was collected. Redistillation gave the product (7.7 g. — 45%) as a colorless liquid, B.P. 134°–138° C. Analysis: Calculated for $C_6H_{10}F_3NO$: C, 42.6; H, 6.0; N, 8.3%. Found: C, 42.4; H, 6.3; N, 8.5%.

EXAMPLE 14

2-Trifluoromethyl-4-methyl-5-phenyloxazolidine

Norephedrin hydrochloride (9.38 g. — 0.05 moles) in ethanol (100 ml.) was neutralized with sodium ethoxide solution. The sodium chloride was removed by filtration, and the solution concentrated to give an oil. Benzene (200 ml.) was then added, followed by trifluoroacetaldehyde hydrate (6.5 g. — 0.055 moles). The mixture was refluxed for 1 hour, then boiled under a Dean and Stark trap for 18 hours. Water (1.8 ml. — 0.1 mole) collected in the trap. The solvent was removed by evaporation and the residual liquid was distilled under vacuo. The product was 7 g. (61%) of a colorless oil, B.P. 102°–106°C/4mm. Analysis: Calculated for $C_{11}H_{12}F_3NO$: C, 57.1; H, 5.2; N, 6.1%. Found: C, 57.4; H, 5.4; N, 6.3%.

EXAMPLE 15

2-Pentafluoropropyloxazolidine

Pentafluoropropionaldehyde hemiacetal (19.3 g. — 0.1 mole) and ethanolamine (6.1 g. — 0.1 mole) in benzene (100 ml.) refluxed for 1 hour. The reaction was continued under Dean and Stark trap for 6 hours. The reaction mixture was concentrated and passed through a short alumina column. The eluted solution was concentrated and distilled. The product was obtained as a clear oil (9.0 g. — 47%), B.P. 132°–134° C. Analysis: Calculated for $C_5H_6F_5NO$: C, 31.4; H, 3.2; N, 7.3%. Found: C, 31.6; H, 3.5; N, 7.8%.

EXAMPLE 16

2-Trifluoromethylperhydro-1,3-oxazine

Trifluoroacetaldehyde hydrate (13 g. — 0.11 moles) and 3-amino propanol (7.5 g. — 0.1 mole) in benzene (100 ml.) were refluxed for one-half hour, then for 18 hours using a Dean and Stark trap. Water (3.6 g. — 0.2 moles) was evolved. The reaction mixture was then passed through a short alumina column, concentrated to an oil and distilled. The fraction boiling to 170° C. was collected (11.2 g.). This material was redistilled to give the product (8.7 g. — 56%) as a clear liquid, B.P. 130°–135° C. Analysis: Calculated for: $C_5H_8F_3NO$: C, 38.7; H, 5.2; N, 9.0%. Found: C, 38.8; H, 5.5; N, 9.3%.

EXAMPLE 17

2-Trifluoromethylperhydro-1,3-oxazocine

Trifluoroacetaldehyde (13 g. — 0.11 moles) and 5-aminopentanol (10.3 g. — 0.1 mole) in benzene (100 ml.) were boiled under reflux for one-half hour then under a Dean and Stark trap for 20 hours. Water (4.0 ml.) collected in the trap. The solvent was then removed and the residue distilled to give 10.4 g. of a liquid, B.P. 90°–120°C/4mm. This was redistilled to give a product (9.5 g. — 52%) as a liquid, B.P. 100°–110°C/4mm. Analysis: Calculated for $C_7H_{12}F_3NO$: C, 45.9; H, 6.6; N, 7.6%. Found: C, 46.1; H, 6.8; N, 7.6%.

EXAMPLE 18

Methyl-2-trifluoromethyl-4,4-dimethylthiazolidine-5-carboxylate

Penicillamine methyl ester (16.3 g. — 0.1 mole) and trifluoroacetaldehyde hydrate (12 g. — 0.104 moles) in benzene were refluxed for one-half hour then for 18 hours under a Dean and Stark trap. The solvent was removed by evaporation to leave an oil, which was distilled to yield the product (10.6 g. — 44%), B.P. 68°–72°C/30mm. Analysis: Calculated for $C_{18}H_{12}NF_3O_2S$: C, 39.5; H, 5.0; N, 5.8%. Found: C, 39.8; H, 5.3; N, 5.8%.

EXAMPLE 19

2,2-Bis(trifluoromethyl)imidazolidine monohydrate

Hexafluoroacetone sesquihydrate (5.8 g. — 0.03 moles) and ethylene diamine (1.8 g. — 0.03 moles) were mixed in benzene (150 ml.). The mixture was refluxed for one-half hour, then for 6 hours under a Dean and Stark trap. Water (about 1 ml.) collected in the trap. The solvent was then removed to leave a white solid which was recrystallized from ether. The recrystallized solid was purified by sublimation at 0.5 mm to yield 4.0 g. (59%) of a product as white solid, m.p. 109°–111°C. (in a sealed tube). Analysis: Calculated for $C_5H_6F_6N_2H_2O$: C, 26.6; H, 3.6; F, 50.4; N, 12.4%. Found: C, 26.7; H, 3.5; F, 49.9; N, 12.3%.

EXAMPLE 20

2,2-Bis(trifluoromethyl)-4-methyl-imidazolidine monohydrate

Hexafluoroacetone sesquihydrate (5.8 g. — 0.03 moles) and 1,2-diaminopropane (2.6 g. — 0.035 moles) were mixed in benzene (150 ml.). The mixture was first refluxed for one-half hour then boiled for 2 hours under a Dean and Stark trap. The reaction mixture was then concentrated to give a white solid which was purified by recrystallization from chloroform/light petrol, followed by sublimation at 0.5 mm. The product amounted to 4.3 g. (60%) of a white crystalline solid, m.p. 95°–97° C. Analysis: Calculated for $C_6H_8F_6N_2O$: C, 30.0; H, 4.2; N, 11.7; F, 47.5%. Found: C, 30.2; H, 4.3; N, 11.6; F, 47.2%.

EXAMPLE 21

2,2-Bis(trifluoromethyl)perhydro-1,3-diazepine

Hexafluoroacetone sesquihydrate (19.3 g. — 0.1 mole) and 1,4-diaminobutane (8.8 g. — 0.1 mole) in benzene (100 ml.) were refluxed for 1 hour, then for 18 hours under a Dean and Stark trap. The solvent was removed to leave a white solid which was recrystallized from chloroform. The product was 9.2 g. (36%) of a white crystalline solid m.p. 108°–112° C. (in a sealed tube). Analysis: Calculated for $C_7H_{10}F_6N_2.H_2O$: C, 33.1; H, 5.1; N, 11.0%. Found: C, 33.1; H, 4.8; N, 11.0%.

EXAMPLE 22

2,2-Bis(trifluoromethyl)-thiazolidine monohydrate

2-Mercaptoethylamine hydrochloride (10 g. — 0.088 moles) in ethanol (100 ml.) was deoxygenated by passage of dry nitrogen. The solution was neutralized with sodium ethoride solution. Hexafluoroacetone sesquihydrate (17 g. — 0.088 moles) was then added and the mixture boiled for 2 hours with passage of nitrogen. The solvent was removed and the residue was extracted with dry ether, filtered and the filtrate was concentrated to give a crystalline solid. Recrystallization gave 10.9 g. (51%) of a white crystalline solid, m.p. 115°–117° C. Analysis: Calculated for $C_5H_5F_6NS.H_2O$: C, 24.7; H, 2.9; F, 46.9; N, 5.8%. Found: C, 25.0; H, 2.9; F, 47.5; N, 5.9%.

EXAMPLE 23

2,2-Bis(trifluoromethyl)-4-methyl-5-phenyloxazolidine monohydrate

Norephedrin hydrochloride (4.7 g. — 0.025 moles) in ethanol was neutralized with sodium ethoxide. The mixture was concentrated to dryness and extracted with benzene (100 ml.). Solids insoluble in benzene were removed by filtration, and the filtrate was treated with hexafluoroacetone sesquihydrate (5 g. — 0.026 moles). The reaction mixture was refluxed for one-half hour then connected to a Dean and Stark trap for a further hour. The solvent was then removed and the residue dissolved in methylene chloride. The addition of petrol caused crystallization of the product. The product was purified by recrystallization from methylene chloride/petrol to yield 4.4 g. (35%) of a white crystalline solid, m.p. 116° C. Analysis: Calculated for $C_{12}H_{11}F_6NO.H_2O$: C, 45.5; H, 4.1; N, 4.4%. Found: C, 45.6; H, 4.2; N, 4.6%.

EXAMPLE 24

N-[(1-hydroxy-1-trifluoromethyl-2,2,2-trifluoro)ethyl]ethanolamine

Hexafluoroaceton Hexafluoroacetone (5 g. — 0.026 moles) and ethanolamine (1.59 g. — 0.026 moles) in benzene (100 ml.) were refluxed for 1 hour, then for 4 hours under a Dean and Stark trap. Removal of solvent left a white solid, which was purified by dissolving in ether and chromatographing an acidic alumina. The eluted solution was concentrated to give a solid, which was recrystallized from ether to yield 3.3 g. (61%) of a white solid, m.p. 107°–109° C. Analysis: Calculated for $C_5H_7F_6NO_2$: C, 26.4; H, 3.1; N, 6.2%. Found: C, 26.3; H, 3.3; N, 6.3%.

EXAMPLE 25

1,1,1,3,3,3-Hexafluoro-2-hydroxy-2-(N-piperazinyl) propane hydrate

Hexafluoroacetone sesquihydrate (19.3 g. — 0.1 mole) and piperazine hexahydrate (19.4 g. — 0.1 mole) in toluene (150 ml.) were refluxed for 1 hour, then for 1½ hours under a Dean and Stark trap. The reaction mixture was then cooled and the crystalline material deposited was collected. This material was purified by two recrystallizations from ethyl acetate to yield 11.2 g. of a product (48%) as a white solid, m.p.

133°–136° C. Analysis: Calculated for $C_7H_{10}F_6N_2O.H_2O$: C, 31.1; H, 4.5; N, 10.4%. Found: C, 30.8; H, 4.4; N, 10.4%.

EXAMPLE 26

1,1,1,3,3,3-Hexafluoro-2-(2′-dimethylaminoethyl)aminopropane

Hexafluoroacetone sesquihydrate (9.65 g. — 0.05 moles) and dimethyl ethylenediamine (4.8 g. — 0.055 moles) were mixed in benzene (100 ml.), and then refluxed for 1 hour. The solvent was then removed by evaporation leaving a white crystalline residue. This was purified by crystallization from light petrol. The yield was 11.8 g. (93%) of a white crystalline solid, m.p. 97° C. Analysis: Calculated for $C_7H_{12}F_6N_2O$: C, 33.0; H, 4.8; F, 44.9; N, 11.0%. Found: C, 32.7; H, 4.8; F, 44.4; N, 11.3%.

EXAMPLE 27

1-[N-(1-hydroxy-1,1-bistrifluoromethyl)methyl]amino adamantane sesquihydrate

Adamantylamine (4.82 g. — 0.032 moles) and hexafluoroacetone sesquihydrate (8.1 g. — 0.042 moles) in ethanol (50 ml.) were refluxed for 3 hours. The reaction mixture was then concentrated to dryness and the residue was extracted with dry ether. Concentration of the ether solution gave a sticky solid which was purified by two recrystallizations from ether/light petrol to yield 2.0 g. of a product (25%), m.p. 146°–148° C. (in a sealed tube). Analysis: Calculated for $C_{13}H_{17}F_6NO.1½H_2O$: C, 45.4; H, 5.9; F, 33.1; N, 4.1%. Found: C, 45.8; H, 6.3; F, 33.5; N, 4.3%.

We claim:

1. 2-Trifluoromethyl oxazolidine.

* * * * *

UNITED STATES PATENT AND TRADEMARK OFFICE
CERTIFICATE OF CORRECTION

PATENT NO. : 3,868,384
DATED : February 25, 1975
INVENTOR(S) : Stephen S. Szinai, et al.

It is certified that error appears in the above-identified patent and that said Letters Patent are hereby corrected as shown below:

Column 8, line 46, "Hexafluoroacetone Hexafluoroacetone" should be --Hexafluoroacetone sesquihydrate--.

Column 9, line 6, "Hexafluoro-2-(2-" should be --Hexafluoro-2-hydroxy-2-(2'---

Signed and Sealed this

Third Day of August 1976

[SEAL]

Attest:

RUTH C. MASON
Attesting Officer

C. MARSHALL DANN
Commissioner of Patents and Trademarks